United States Patent [19]
Smith et al.

[11] Patent Number: 5,447,060
[45] Date of Patent: Sep. 5, 1995

[54] CHASIS DYNAMOMETER WITH IMPROVED TORQUE MEASUREMENT

[75] Inventors: Calvert L. Smith, Lake Angelus; Christopher R. Vogt, Rochester Hills, both of Mich.; Hans J. Dadt, Heppenheim, Germany

[73] Assignee: Schenck Pegasus Corporation, Troy, Mich.

[21] Appl. No.: 157,521

[22] Filed: Nov. 26, 1993

[51] Int. Cl.6 ................................................ G01F 1/00
[52] U.S. Cl. .................................... 73/117; 73/862.09
[58] Field of Search ............... 73/117, 862.09, 862.16, 73/862.18

[56] References Cited

U.S. PATENT DOCUMENTS 3,377,849  4/1968  Lebow ............................. 73/862.09
4,327,578  5/1982  D'Angelo ........................ 73/862.18
5,101,660  4/1992  LaBelle ............................. 73/117

OTHER PUBLICATIONS

D'Angelo, et al., "Large-Roll Chassis Dynamometer With AC Flux Vector PEU and Friction-Compensated Bearings", SAE Paper 930391, Mar. 1993.

Primary Examiner—Richard E. Chilcot, Jr.
Assistant Examiner—R. Biegel
Attorney, Agent, or Firm—Reising, Ethington, Barnard, Perry & Milton

[57] ABSTRACT

A chassis dynamometer is described which is especially adapted for road simulation. A torque transducer is connected in the roll assembly so that the torque signal is not influenced by bearing friction. The torque transducer outer element is rigidly attached to the roll and the inner element is rigidly attached to the roll shaft.

10 Claims, 6 Drawing Sheets

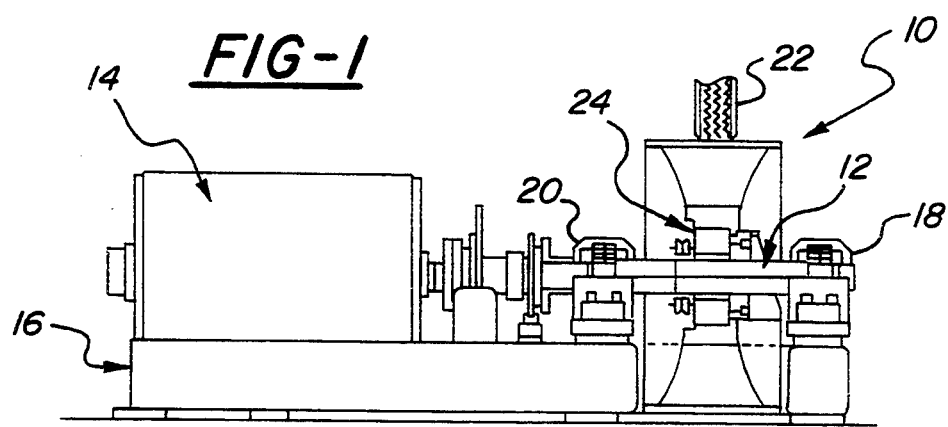
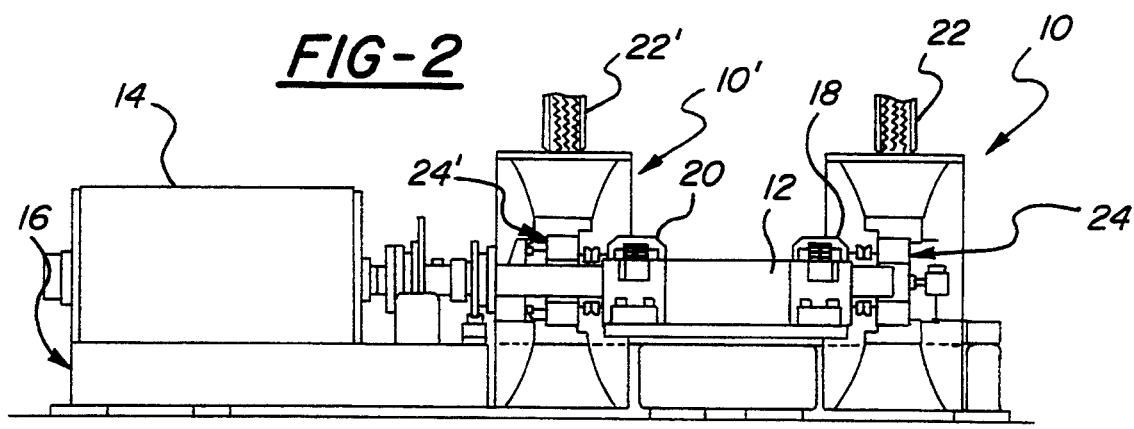
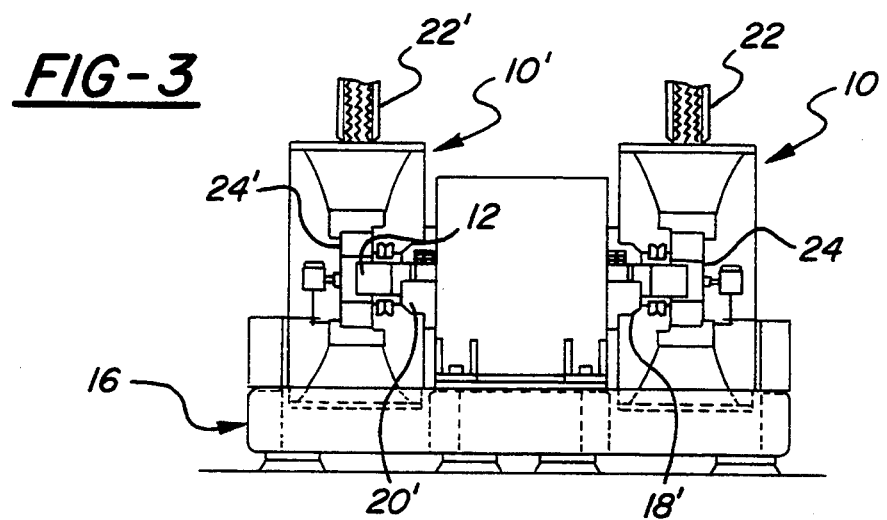

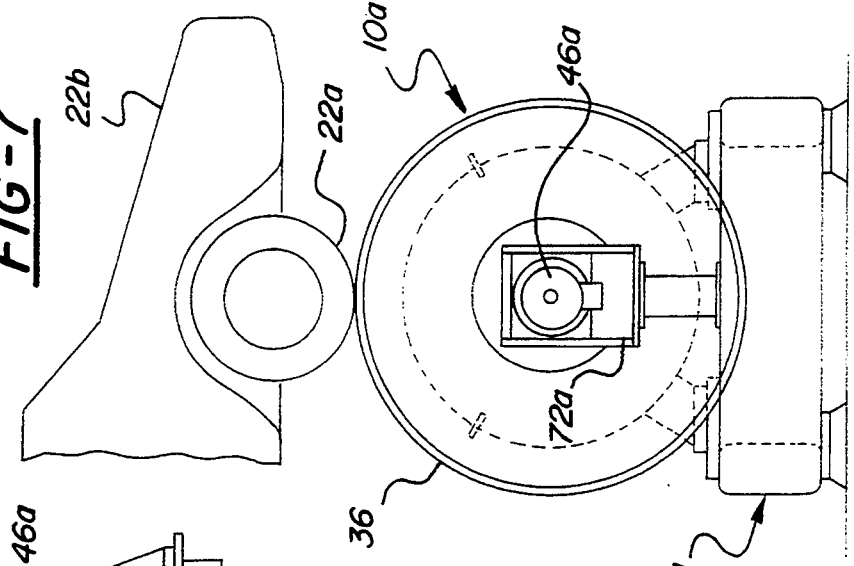
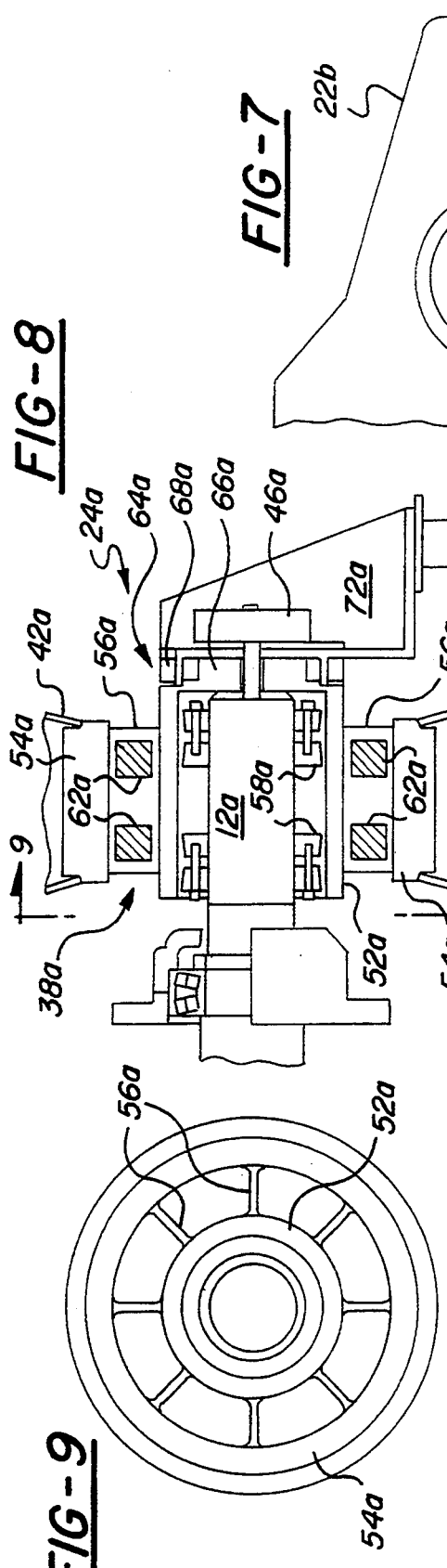
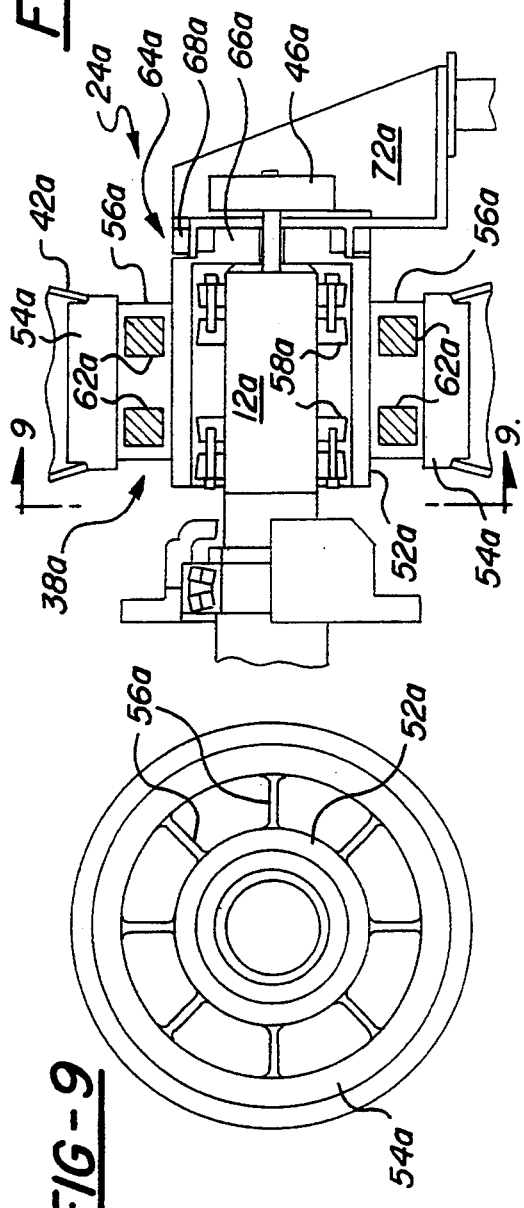
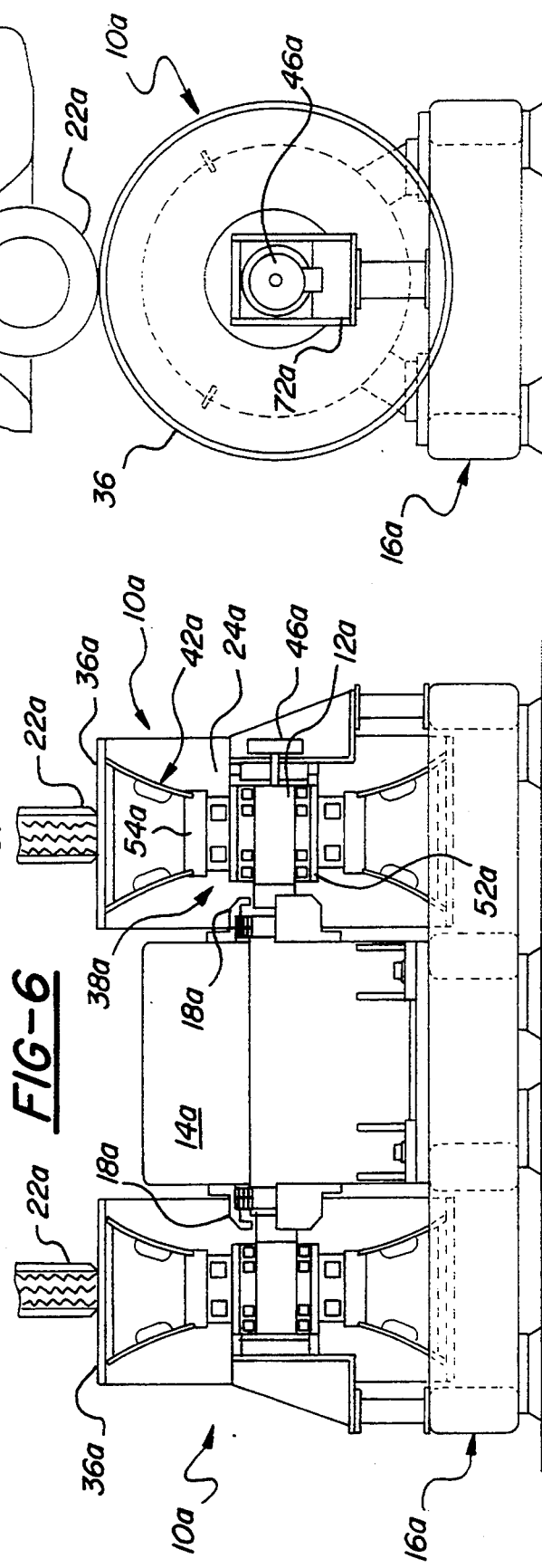

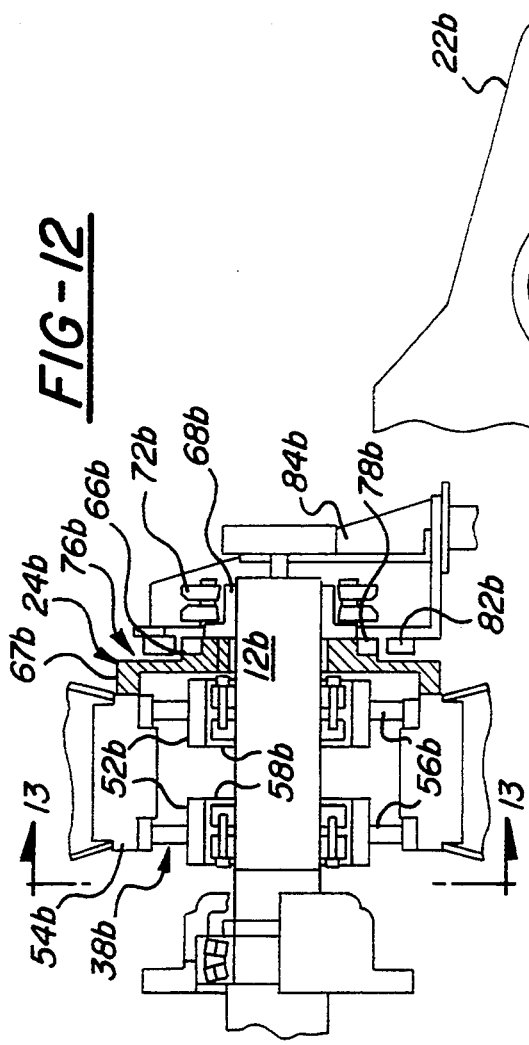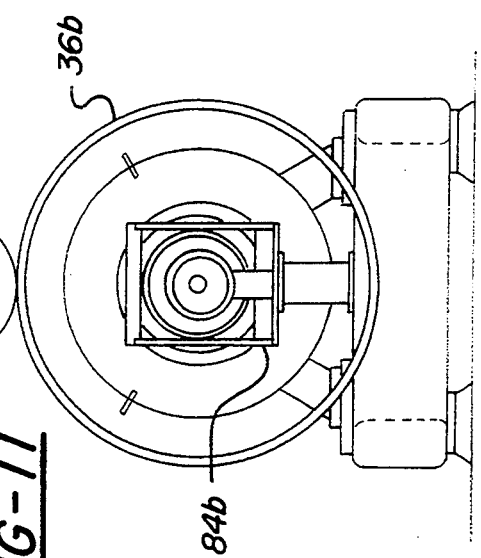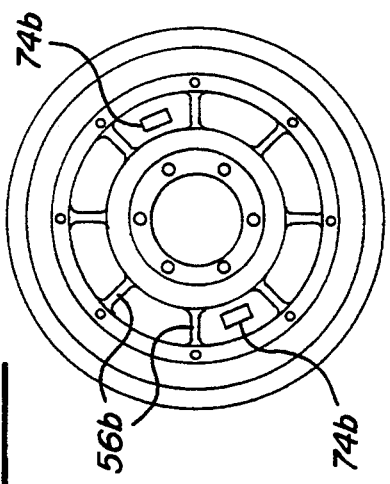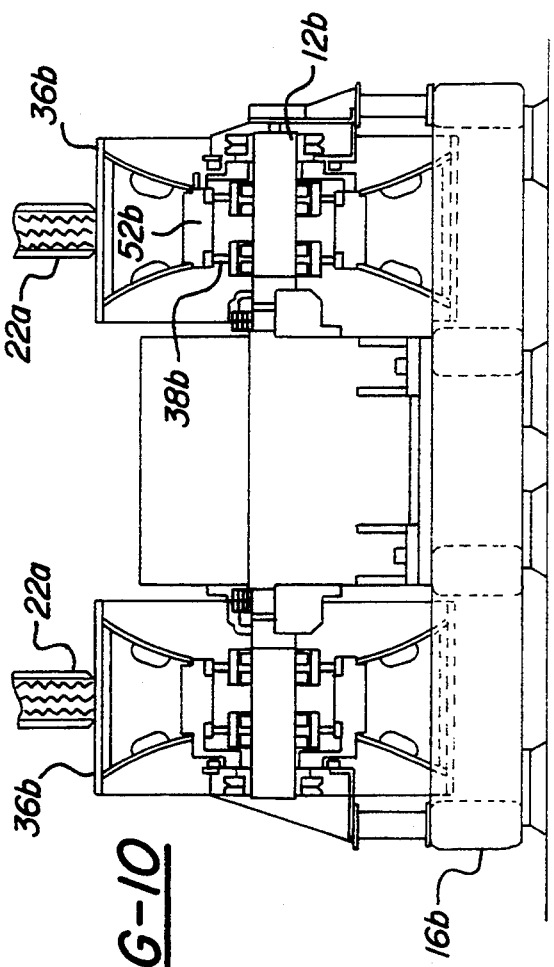

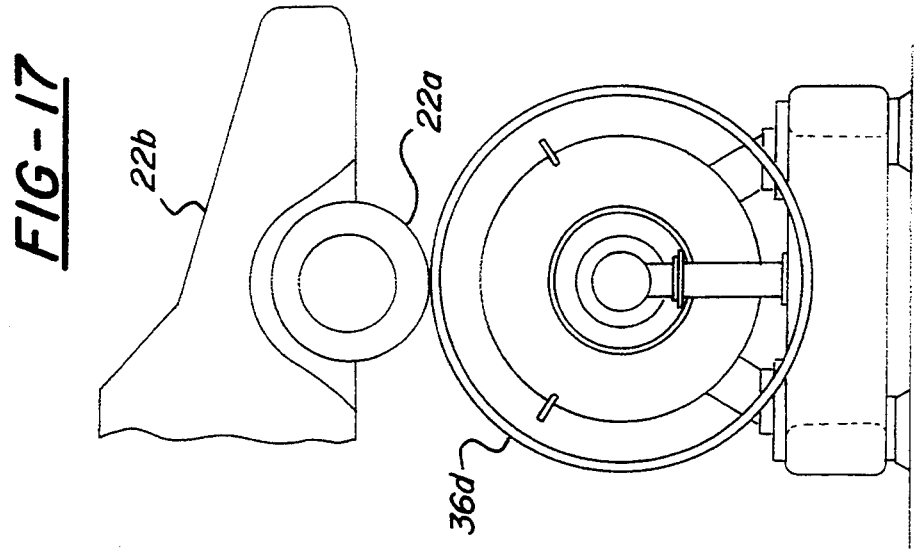
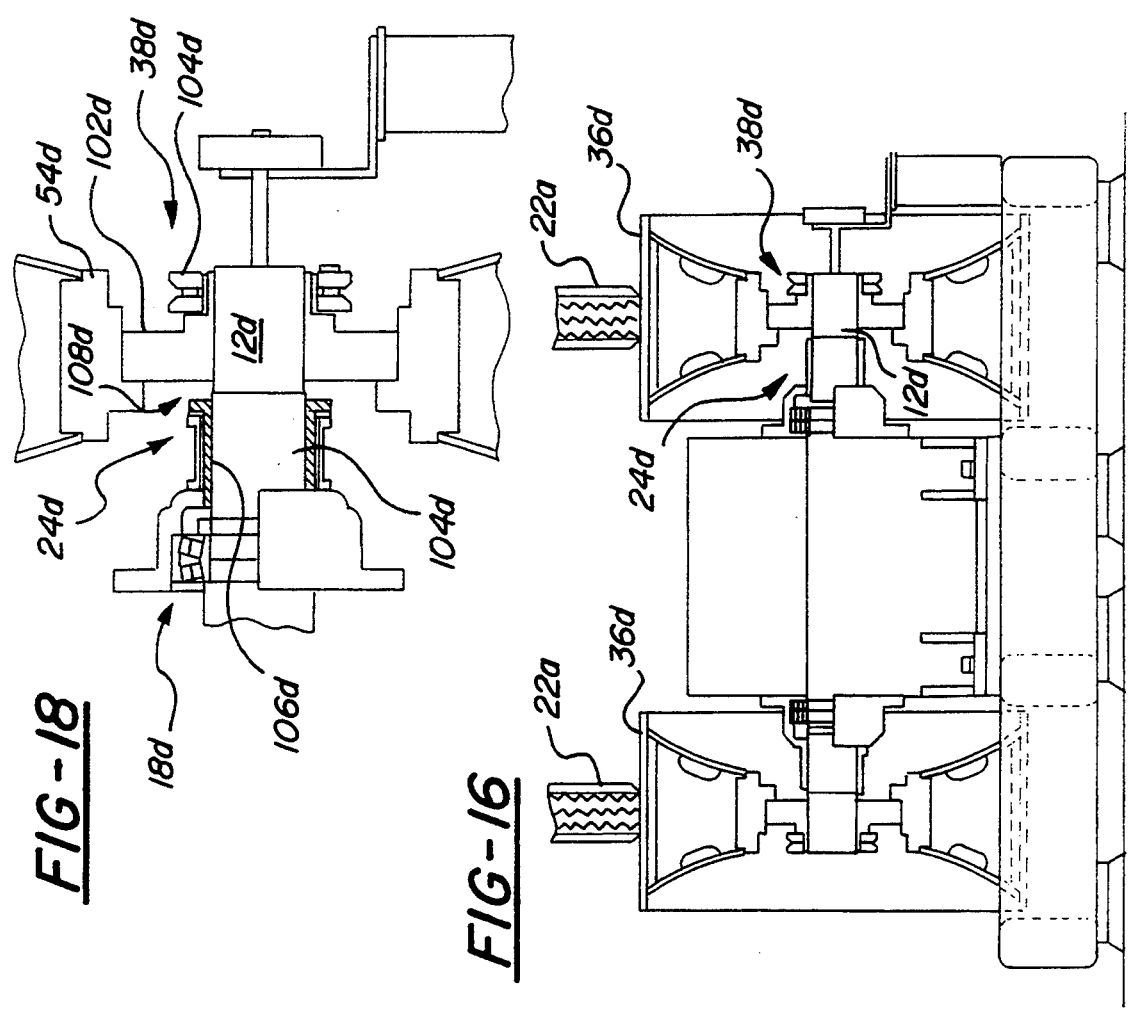

CHASIS DYNAMOMETER WITH IMPROVED TORQUE MEASUREMENT

FIELD OF THE INVENTION

This invention relates to dynamometers; more particularly, it relates to vehicle chassis dynamometers of the type known as roll dynamometers.

BACKGROUND OF THE INVENTION

Dynamometers have been used many years in the vehicle manufacturing industry for testing vehicles in place as distinguished from road testing. Vehicle dynamometers are used in various testing operations. One principal use is that of measuring the torque and horsepower output of a vehicle. Another principal use is that of simulating the road load forces and the inertia forces acting upon a vehicle which it encounters during actual operation of the vehicle on a roadway. In both applications, the dynamometer must be capable of measuring roll torque with a high degree of accuracy.

In recent years, the regulation of vehicle emissions has become increasingly stringent for the purpose of protecting the environment and for fuel economy. In the United States, the Environmental Protection Agency has established vehicle standards which require highly sophisticated chassis roll dynamometers for road simulation in the testing of vehicles. In this capacity, the dynamometer must simulate the forces acting on the driving tires of a vehicle travelling on a roadway. In this simulation function, the vehicle must be operated on the rolls of the dynamometer and exhibit the speed, torque, acceleration and distance travelled over extended time periods as it would if actually driven on a roadway in the same manner.

A typical chassis roll dynamometer comprises at least one dynamometer roll which is rotatably mounted in a stationary frame and which supports one driving wheel of a vehicle to be tested. The roll is typically of large diameter, several times that of the vehicle wheel. There is driving engagement between the vehicle wheel and the roll by reason of the tractional forces of the wheel such that the vehicle wheel may drive the roll or vice-versa, depending upon the test being conducted. The dynamometer system also comprises apparatus for simulating road load forces acting upon the vehicle wheel and for simulating inertia forces acting upon the vehicle during acceleration and deceleration. The road load forces include rolling friction and windage. The apparatus for simulating road load forces comprises a motor coupled with the roll through a roll shaft and a controller for controlling energization of the motor in accordance with the simulation or testing being conducted. In some systems, a flywheel is coupled with the roll shaft for simulating inertia. The motor of the dynamometer system is sometimes referred to as a power exchange unit because it may be operated to apply power to or absorb power from the vehicle wheel through the roll. The motor is operated as a torque generating or absorbing device and may be either a DC or an AC motor, for example, with a suitable electronic controller which includes a computer.

In a dynamometer system of the type described above, it is common practice to provide instrumentation for the measurement of the torque output of the vehicle wheel and the velocity of the wheel. The torque is measured by a torque transducer connected in the drive train of the dynamometer for providing a roll torque signal to the controller. Wheel speed is measured by a shaft encoder suitably connected with the roll shaft of the dynamometer for supplying a velocity signal to the controller.

A longstanding problem in achieving a high degree of accuracy in vehicle simulation and testing is that of providing accurate compensation for torque measurement errors caused by friction in the roll shaft bearings due to applied load and viscosity friction. It has been a common practice in chassis roll dynamometers to install the torque transducer in the driven shaft between a shaft bearing and the motor. In this arrangement, the torque transducer does not produce an accurate measurement of the torque applied to or absorbed from the roll because it is influenced by the bearing torque. In the prior art, there have been attempts to provide compensation for the measurement errors arising from bearing friction. Such prior art has disadvantages in that the torque measurement errors are not precisely compensated or eliminated and a complex and costly system is required. Also, changes in oil viscosity, applied load and tractive effort forces will influence bearing friction torques.

A dynamometer system which provides compensation for certain friction and windage losses is described in the D'Angelo et al. U.S. Pat. No. 4,327,578 granted May 4, 1982. This patent describes a chassis roll dynamometer with a roll assembly which is connected by a shaft with a motor and a flywheel mounted on the shaft between the motor and the roll assembly. A torque transducer between the motor and the flywheel provides a torque signal to a system controller and a speed transducer on the shaft provides a speed signal to the controller. The system utilizes an equation to determine the actual force output of the vehicle which expresses a functional relationship between the force reading from the torque transducer, the measured control speed and the mechanical inertia outside the torque transducer loop. The patent states that because the force outside the torque loop is accounted for, the torque transducer is free to be placed between the flywheel and the DC motor and also permits the torque transducer be placed next to the rollers or even directly on the vehicle itself. It is noted in the patent that the frictional and windage parasitic losses are subtracted from the torque sensor signal when the signal is conditioned. In particular, the patent refers to the friction and windage compensation for parasitic losses occurring within the DC motor by adding certain factors to the calculated force signal to obtain a compensated force signal which is applied to the power converter to control the armature current to the DC motor. According to this prior art it is known to compensate a force or torque measurement signal to for certain errors arising from friction and windage in the system.

A chassis roll dynamometer which is provided with friction compensated bearings on the roll shaft is described in SAE Paper 930391 entitled "Large Roll Chassis Dynamometer with AC Flux Vector PEU and Friction-Compensated Bearings" dated Mar. 1–5, 1993. In this dynamometer, the roll bearing friction is compensated mechanically by providing a bearing race carrier between the inner and outer races which is driven by a motor at the same speed as the roll shaft. The motorized bearing is designed to cancel the effect of the bearing friction which would otherwise produce a torque which would be sensed by the torque transducer and be indistinguishable from the torque applied by the vehicle tires.

A general object of this invention is to provide an improved chassis roll dynamometer which overcomes certain disadvantages of the prior art.

SUMMARY OF THE INVENTION

In accordance with this invention, a chassis roll dynamometer is provided which eliminates roll torque measurement inaccuracies due to bearing friction. This is accomplished by connecting a torque transducer in the roll drive train at a location outside the roll bearings so that the torque feedback signal is not influenced by bearing friction.

Further, in accordance with this invention, a chassis roll dynamometer is provided with a torque transducer for producing a torque signal in response to torque transmitted between the rim of the roll and a location on the roll shaft between the rim and the shaft bearing. The torque transducer comprises a torque transmitting member and a sensing member for generating a torque signal, the torque transmitting member being connected to transmit torque in a drive train between the rim of the roll and said location on the roll shaft.

A complete understanding of this invention may be obtained from the detailed description that follows taken with the accompanying drawings.

DESCRIPTION OF THE DRAWINGS

FIG. 1 depicts a chassis roll dynamometer of the single-ended motor type with a single roll which incorporates a torque transducer according to this invention;

FIG. 2 depicts a chassis roll dynamometer of the single-ended motor type with double rolls incorporating a torque transducer according to this invention;

FIG. 3 depicts a chassis roll dynamometer of the double-ended motor type with double rolls incorporating a torque transducer according to this invention;

FIG. 6 is a front elevation view, partially in section, of a dynamometer with a first embodiment of the torque transducer incorporated into the roll structure;

FIG. 7 is a side view of the dynamometer of FIG. 6;

FIG. 8 is an enlarged view of the torque transducer of the dynamometer of FIGS. 6 and 7;

FIG. 9 is a view taken on lines 9—9 of FIG. 8;

FIG. 10 is a front elevation view, partially in section, of a dynamometer with a second embodiment of the torque transducer incorporated in the roll structure;

FIG. 11 is a side elevation view of the dynamometer of FIG. 10;

FIG. 12 is an enlarged view showing the torque transducer of the dynamometer of FIGS. 10 and 11;

FIG. 13 is a view taken on lines 13—13 of FIG. 12;

FIG. 16 is a front elevation view, partially in section, of a dynamometer with a fourth embodiment of the torque transducer incorporated in the roll shaft;

FIG. 17 is a side elevation view of the dynamometer of FIG. 16;

FIG. 18 is an enlarged view showing details of the torque transducer of the dynamometer of FIGS. 16 and 17;

BEST MODE FOR CARRYING OUT THE INVENTION

Figure 4:
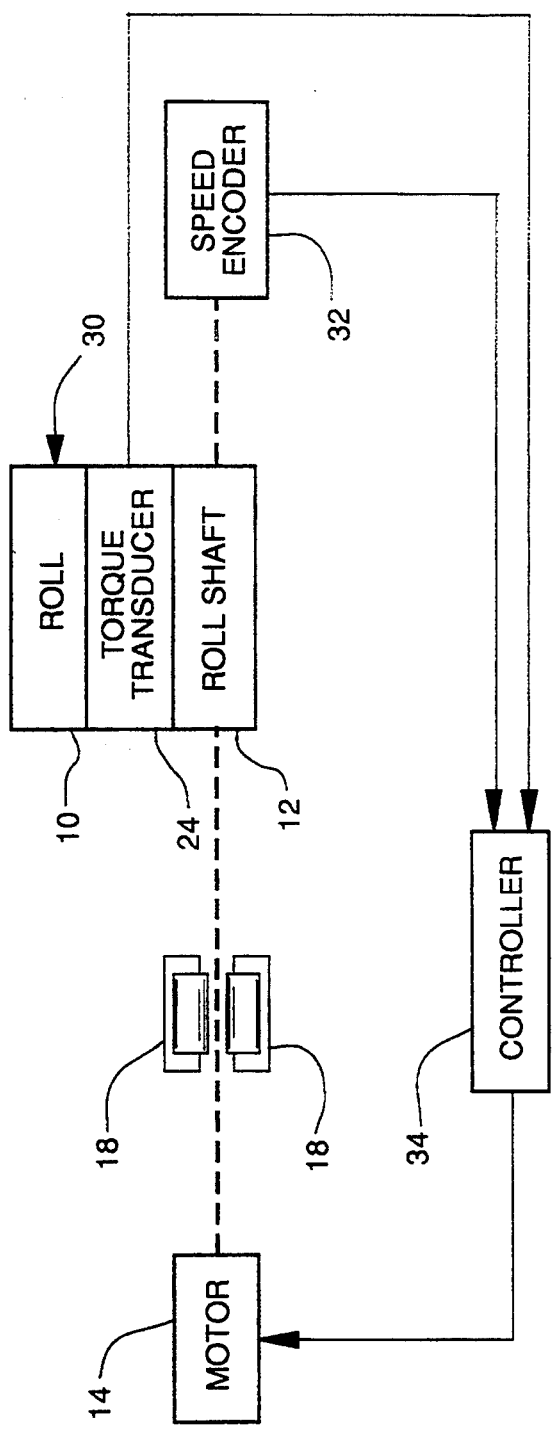
FIG. 4 is a block diagram of a dynamometer showing the torque feedback loop in relation to the roll shaft bearings.

Referring now to the drawings, there is shown an illustrative embodiment of the invention in a chassis roll dynamometer with a torque transducer located in the roll drive train outside the roll shaft bearing for producing a torque signal in response to torque in the drive train which extends between the rim of the roll and a location on the shaft between the rim and the bearing. It will be appreciated, as the description proceeds, that the invention may be realized in a wide variety of embodiments.

General Description

FIGS. 1, 2 and 3 illustrate different configurations of chassis roll dynamometers which are typical of those in which this invention may be incorporated. FIG. 1 shows a dynamometer with a single-ended motor and single roll. It comprises, in general, a roll 10 which is mounted on a roll shaft 12 which is coupled to a motor 14 supported on a stationary frame 16. The roll 10 is mounted on the shaft 12 for rotation therewith and the shaft is rotatably supported on the frame 16 by a pair of bearings 18 and 20. A wheel 22 of a vehicle to be tested is supported on the roll 10 in driving engagement therewith. Torque is transmitted between the vehicle driving wheel 22 and the motor 14 through the roll 10 and the roll shaft 12. A torque transducer 24 is incorporated in the roll 10 for measurement of the tractive effort of the vehicle driving wheel 22.

FIG. 2 shows a dynamometer with a single-ended motor and double rolls. It comprises, in general, a pair of rolls 10 and 10' mounted on a common roll shaft 12 which is coupled to a motor 14. The motor is mounted on a stationary frame 16 and the shaft 12 is supported on the frame by a pair of bearings 18 and 20. A pair of vehicle driving wheels 22 and 22' are supported on the rolls 10 and 10' respectively, in driving engagement therewith A torque transducer 24 is incorporated in the roll 10 and a torque transducer 24' is incorporated in the roll 10'. This permits measurement of roll torque at each roll.

FIG. 3 shows a dynamometer with a double-ended motor and a pair of rolls. The motor 14' is supported on the frame 16' between a roll 10 and a roll 10'. The roll 10 is supported on one end of the motor shaft 12' and the roll 10' is supported on the other end of the shaft. The shaft 12' is rotatably mounted by bearings 18' and 20'. A pair of driving wheels 22 and 22' are supported on the rolls 10 and 10', respectively, in driving engagement therewith. A torque transducer 24 is incorporated in the roll 10 and a torque transducer 24' is incorporated in the roll 10'.

A dynamometer system according to this invention is illustrated in block diagram form in FIG. 4. The roll drive train 30 comprises a roll 10, a shaft 12 and a torque transducer 24. The roll drive train 30 is mechanically coupled, as depicted by the dashed line, to the motor 14 and is supported for rotation by the bearings 18. A speed encoder 32 is mechanically coupled with the roll shaft. A velocity signal from the encoder 32 and a torque signal from the torque transducer 24 are supplied as inputs to a controller 36 which controls energization of the motor 14.

Figure 5:
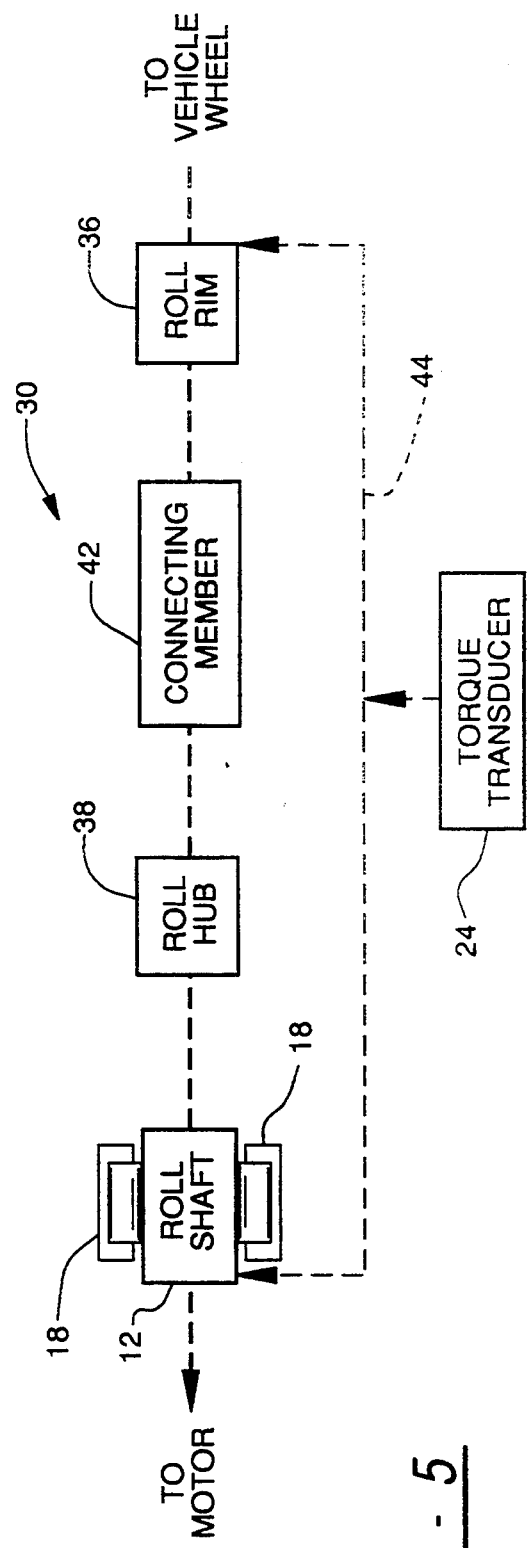
FIG. 5 is a diagrammatic representation of the mechanical connection of the torque transducer in the roll drive train in relation to the roll shaft bearings.

The roll drive train 30 is depicted diagrammatically in FIG. 5. As described above, the roll drive train 30 comprises the roll 10, roll shaft 12 and torque transducer 24. The drive train within the roll 10 includes the roll rim 36 which is drivingly engaged by the vehicle wheel and it includes the roll hub 38 which is drivingly connected with the roll shaft 12. Also, within the roll, the roll rim 36 and roll hub 38 are drivingly interconnected by a connecting member 42 which may take any suitable form for transmitting torque between the rim and the hub. The roll drive train 30 extends from the roll rim 36 to and includes the roll shaft 12. The roll drive train 30 also comprises the torque transducer 24 which has its torque transmitting member interposed in the drive train 30 at a selected location between the traction surface of the rim 36 and the bearing 18. The range of selected locations for interposing the torque transducer is indicated in FIG. 5 by the dashed line 44. The incorporation of the torque transducer in the drive train 30 at selected locations will be described below with reference to specific embodiments of the invention.

First Embodiment

The first embodiment of the invention is shown in FIGS. 6 through 9. It comprises a dynamometer with a double-ended motor and double rolls. The motor 14a is mounted on the stationary frame 16a. The motor shaft is double-ended and constitutes the roll shaft 12a which is supported in bearings 18a at opposite ends of the motor. The shaft 12a supports two rolls 10a, which are identical to each other, at opposite ends of the shaft. A vehicle 22b to be tested on the dynamometer has two driving wheels 22a supported by the respective two rolls 10a.

Since the two rolls 10a are of identical construction, only the roll 10a at the right and end of the shaft 12a (as viewed in FIG. 6) will be described in detail. The roll 10a comprises, in general, a roll rim 36a, a roll hub 38a and an annular connecting member 42a which connects the rim 36a and the hub 38a in a torque transmitting connection. A torque transducer 24a is incorporated in the structure of the hub 38a and will be described in detail below. A speed encoder 46a is mounted on one end of the roll shaft 12a.

The structure of the hub 38a and the torque transducer 24a incorporated in the hub structure will be described with reference to the enlarged views of FIGS. 8 and 9. The hub 38a comprises a cylindrical sleeve 52a and a coaxial, radially spaced cylindrical ring 54a which are drivingly coupled by a plurality of radially extending flat spokes 56a, all of which may be of unitary construction. The hub 38a is non-rotatably mounted on the shaft 12a by a pair of annular wedge clamps 58a disposed between the inside diameter of the sleeve 52a and the shaft 12a. The connecting member 42a of the roll is drivingly connected with the hub 38a which connects it to the ring 54a.

The torque transducer 24a comprises a torque transmitting member and a sensing member; the torque transmitting member is constituted by the spokes 56a and the sensing member comprises strain gages 62a mounted on one or more of the spokes 56a. The spokes are sufficiently torsionally compliant to allow measurable strain but are substantially rigid radially and in respect to lateral bending moments. The electrical signals developed by the strain gages 62a are conducted through wires (not shown) to a non-contacting signal coupling device 64a and thence through wires (not shown) to the controller 34. The coupling device comprises a movable coupling member 66a and a stationary coupling member 68a. The movable coupling member 66a is mounted on the end of the sleeve 52a for rotation therewith. The stationary coupling member 68a is of annular configuration and is mounted on a stationary support bracket 72a. The signal coupling device 64a is suitably a rotary transformer of a well-known type such as that shown in the Reich U.S. Pat. No. 4,412,198 granted Oct. 25, 1983. In this First Embodiment and in each of the Second, Third and Fourth Embodiments described below, the strain gages are applied and interconnected and the signals from the strain gages 62a are suitably processed in a known manner to cancel cross-talk and extraneous load signal components to obtain an accurate measure of the torque transmitted through the roll.

Second Embodiment

The second embodiment of the invention will be described with reference to FIGS. 10 through 13. This embodiment is illustrated in the same dynamometer as in the first embodiment which is of the same structure except for the hub 38b and the torque transducer 24b, which will now be described. (Those parts of the dynamometer which are the same as those in the first embodiment will be designated with the same reference numerals followed by the letter "b" instead of "a".)

The hub 38b comprises a pair of axially spaced cylindrical sleeves 52b and an outer coaxial cylindrical ring 54b. Each of the cylindrical sleeves 52b is joined with the ring 54b by a plurality of spokes 56b for transmitting torque therebetween. The spokes 56b are unitary with the sleeve 52b and are connected to the ring 54b. Each of the sleeves 52b is non-rotatably mounted on the shaft 12b by an annular wedge clamp 58b. The hub 38b constitutes a flexure mount for the roll on the shaft which is rigid in all degrees of freedom except that it is torsionally compliant.

The torque transducer 24b comprises a torque transmitting member and a sensing member. The torque transmitting member 66b is of circular disk shape and is provided with a laterally extending flange 67b around its periphery for connection with the ring 54b of the hub 38b. The torque transmitting member 66b is provided with a central opening which allows the shaft 12b to extend through it. The torque transmitting member 66b is connected to the shaft 12b for rotation therewith by a shaft collar 68b which is secured to the shaft by an annular clamp ring 72b. The torque transmitting member 66b is adapted to transmit a predetermined portion of the torque between the ring 54b and the shaft 12b. The torque sensing member comprises plural strain gages 74b which are mounted on the torque transmitting member 66b. The electrical signals developed by the strain gages 74b are connected through wires (not shown) to a non-contacting signal coupling device 76b and thence through wires (not shown) to the controller 34. The coupling device comprises a movable coupling member 78b and a stationary coupling member 82b. The movable coupling member 78b is mounted on the torque transmitting member 66b for rotation therewith. The stationary coupling member 82b is of annular configuration and is mounted on a stationary support bracket 84b.

Third Embodiment

Figure 15:
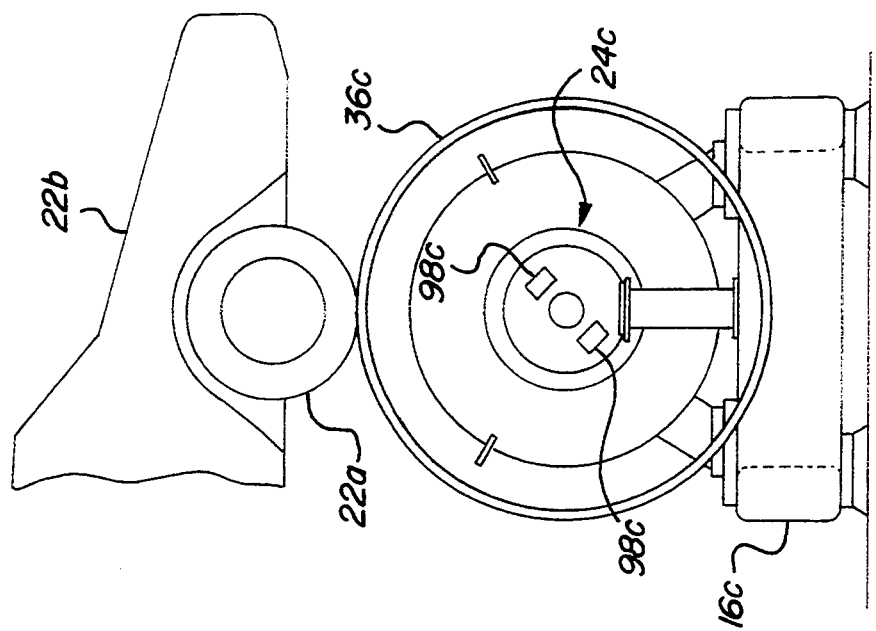
FIG. 15 is a side elevation view of the dynamometer of FIG. 14.
Figure 14:
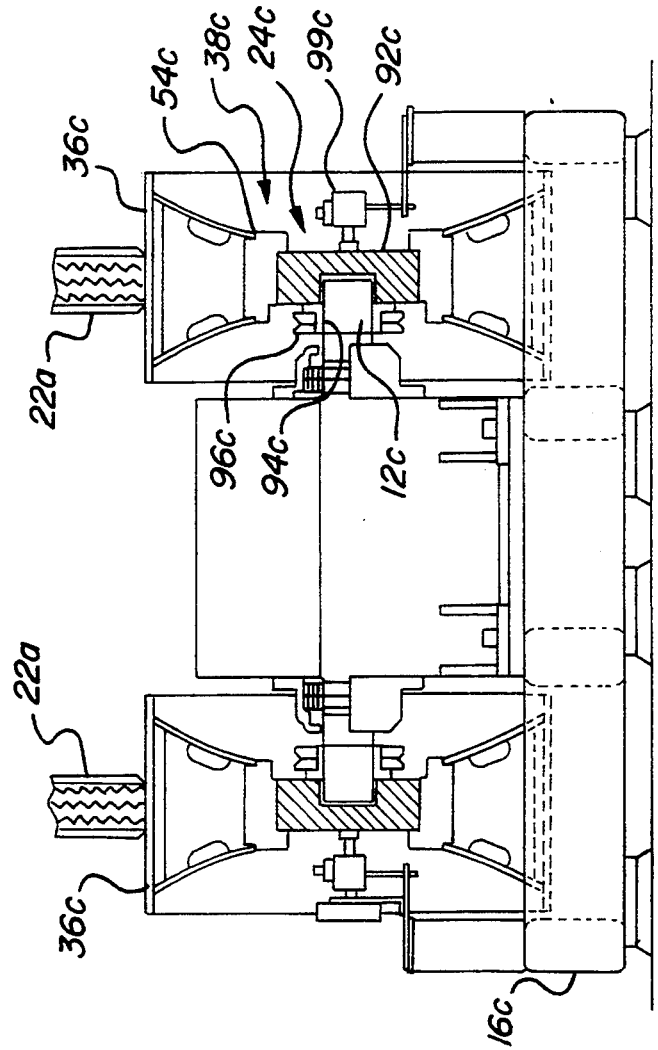
FIG. 14 is a front elevation view, partially in section, of a dynamometer with a third embodiment of the torque transducer incorporated in the roll structure.

The third embodiment of the invention will be described with reference to FIGS. 14 and 15. This embodiment is illustrated in the same dynamometer as in the first embodiment which is of the same structure except for the hub 38c and the torque transducer 24c, which will now be described. (Those parts of the dynamometer which are the same as those in the first embodiment will be designated with the same reference numerals followed by the letter "c" instead of "a".)

The hub 38c comprises a hub ring 54c and the torque transducer 24c. The torque transducer 24c comprises a torque transmitting member 92c of cylindrical configuration which is mounted on the end of shaft 12c in coaxial relation for rotation therewith. The periphery of the torque transmitting member 92c is connected with the coaxial ring 54c. The torque transmitting member 92c is fixedly mounted on the shaft 12c by a shaft collar 94c which is secured thereto by bolts (not shown) and which is held fast on the shaft by an annular wedge clamp 96c. The torque transmitting member could also be secured to shaft 12c by a taper shaft connection with a male taper on the shaft 12c and a female taper in the torque transducer 92c.

The torque transducer 24c also comprises a sensor member which comprises strain gages 98c mounted on the torque transmitting member 92c. The electrical signals developed by the strain gages 98c are applied through a non-contact signal coupling device 99c to the controller 34 in a manner previously described.

Fourth Embodiment

The fourth embodiment of the invention will be described with reference to FIGS. 16, 17 and 18. This embodiment is illustrated in the same dynamometer as in the first embodiment which is of the same structure except for the hub 38d and the torque transducer 24d, which will now be described. (Those parts of the dynamometer which are the same as those in the first embodiment will be designated with the same reference numerals followed by the letter "d" instead of "a".)

The hub 38d comprises a cylindrical member 102d mounted coaxially on the shaft 12d for rotation therewith and it includes a coaxial ring 54d secured to the periphery of the cylindrical member 102d. The cylindrical member 102d is secured to the shaft 12d by an annular wedge clamp 103d.

The torque transducer 24d comprises a torque transmitting member and a sensing member; the torque transmitting member is constituted by a portion 104d of the shaft 12d. The portion 104d of the shaft is adjacent and outside the bearing 18d and has an effective length equal to the effective length of the sensing member. The sensing member comprises a sleeve 106d surrounding the shaft and secured thereto at both ends of the sleeve. The sleeve is provided with one or more strain gages (not shown) which are secured thereto for sensing torque in the shaft. The sleeve is twisted with the shaft in accordance with the torque transmitted by the shaft. The electrical signals developed by the strain gages are applied through a non-contacting signal coupling device 108d to the controller 34 in a manner previously described.

Conclusion

A chassis dynamometer has been described which eliminates roll torque measurement inaccuracies due to bearing friction. The only torque measurement inaccuracy remaining is roll windage which can be accurately measured by the torque transducer at various constant rotational roll speeds (eliminating acceleration and deceleration torques), without a vehicle, and subsequently compensated for by the control system software.

Although the description of this invention has been given with reference to particular embodiments, it is not to be construed in a limiting sense. Many variations and modifications will now occur to those skilled in the art. For a definition of the invention, reference is made to the appended claims.

What is claimed is:

1. A chassis dynamometer for testing vehicles comprising,
   a frame,
   at least one roll and a roll shaft rotatable together,
   a bearing supporting the shaft for rotation on the frame,
   said roll comprising a roll hub and a roll rim with a connecting member therebetween, the roll hub being connected with the roll shaft,
   the roll rim being adapted for supporting a vehicle wheel on a vehicle with a driving connection between the vehicle wheel and the roll rim,
   a dynamometer motor coupled with the roll shaft,
   a controller for controlling energization of the motor to test the vehicle,
   a torque transducer operatively connected between said roll rim and a location between the roll rim and the bearing for producing a torque signal in response to torque at the roll rim wherein the torque signal is not influenced by torque imposed on the shaft by friction in the bearing, said transducer torque signal being operatively coupled with the controller for controlling the energization of the motor to test the vehicle without the influence of friction in the bearing.

2. A chassis dynamometer as defined in claim 1 wherein:
   said torque transducer comprises a torque transmitting member and a sensing member for generating a torque signal,
   the torque transmitting member being connected to transmit torque between the roll rim and said location on the shaft, said sensing member being coupled with the controller.

3. A chassis dynamometer as defined in claim 2 wherein:
   said connecting member between the roll rim and the roll hub includes said torque transmitting member, and said torque transmitting member comprises a plurality of spokes.

4. A chassis dynamometer as defined in claim 3 wherein each of said spokes is torsionally compliant in the circumferential direction and is substantially rigid in the axial and radial directions in response to driving of the roll by said vehicle wheel.

5. A chassis dynamometer as defined in claim 4 wherein:
   said sensing member comprises at least one strain gage mounted on one of said spokes.

6. A chassis dynamometer as defined in claim 4 wherein:
   said sensing member comprises a displacement sensor for sensing angular displacement between the outer ends of said spokes and said shaft.

7. A chassis dynamometer as defined in claim 2 wherein:
   said torque transmitting member comprises a portion of said shaft between said hub and said bearing.

8. A chassis dynamometer as defined in claim 7 wherein:
   said sensing member is a displacement sensor sensing angular displacement between the ends of said portion of said shaft.

9. A chassis dynamometer as defined in claim 7 wherein:
   said sensing member comprises at least one strain gage mounted on said portion of said shaft.

10. A chassis dynamometer as defined in claim 2 wherein:
    said torque transmitting member is connected between said roll hub and said shaft.

* * * * *